US012699107B2

(12) United States Patent
Jiang

(10) Patent No.: US 12,699,107 B2
(45) Date of Patent: Aug. 4, 2026

(54) REAGENT REPLACEMENT METHOD AND DEVICE OF AN ANALYZER

(71) Applicant: Shenzhen Mindray Bio-Medical Electronics Co., Ltd., Shenzhen (CN)

(72) Inventor: Jie Jiang, Shenzhen (CN)

(73) Assignee: Shenzhen Mindray Bio-Medical Electronics Co., Ltd., Shenzhen (CN)

(*) Notice: Subject to any disclaimer, the term of this patent is extended or adjusted under 35 U.S.C. 154(b) by 1119 days.

(21) Appl. No.: 17/357,050

(22) Filed: Jun. 24, 2021

(65) Prior Publication Data

US 2021/0325414 A1 Oct. 21, 2021

Related U.S. Application Data

(63) Continuation of application No. PCT/CN2018/123295, filed on Dec. 25, 2018.

(51) Int. Cl.
*G01N 35/00* (2006.01)

(52) U.S. Cl.
CPC . *G01N 35/00663* (2013.01); *G01N 35/00732* (2013.01); *G01N 35/00871* (2013.01); *G01N 2035/00673* (2013.01); *G01N 2035/00752* (2013.01); *G01N 2035/0091* (2013.01)

(58) Field of Classification Search
None
See application file for complete search history.

(56) References Cited

U.S. PATENT DOCUMENTS

| | | | | |
|---|---|---|---|---|
| 6,090,630 A | * | 7/2000 | Koakutsu | G01N 35/00732 |
| | | | | 422/63 |
| 2012/0074214 A1 | * | 3/2012 | Mizumoto | G01N 35/00732 |
| | | | | 235/375 |

| | | | | |
|---|---|---|---|---|
| 2013/0109101 A1 | * | 5/2013 | Okun | G01N 35/1097 |
| | | | | 436/43 |
| 2018/0348242 A1 | * | 12/2018 | Takemoto | G01N 35/00623 |
| 2019/0227090 A1 | * | 7/2019 | Sasaki | G01N 35/00 |

FOREIGN PATENT DOCUMENTS

| | | | |
|---|---|---|---|
| CN | 101403919 A | 4/2009 |
| CN | 102539797 A | 7/2012 |
| CN | 103175977 A | 6/2013 |
| CN | 106370877 A | 2/2017 |
| CN | 106950387 A | 7/2017 |
| JP | 2010243191 A | 10/2010 |
| WO | 2020132845 A1 | 7/2020 |

* cited by examiner

*Primary Examiner* — P. Kathryn Wright
(74) *Attorney, Agent, or Firm* — Syncoda LLC; Feng Ma

(57) ABSTRACT

Disclosed are a reagent replacement method and device. The reagent replacement method includes: monitoring a working state of a sample analyzer in real-time, and reading failure information when it is detected that automatic sample conveying is suspended; identifying whether a reagent failure exists; if so, displaying a reagent setup window automatically to display information of at least one failed reagent; obtaining reagent information of a replacement reagent, and inputting at least part of the information into a corresponding place in the reagent setup window so as to set up the reagent; judging whether the setup of all the failed reagents is completed; if so, closing the reagent setup window; and executing a reagent reset on the replacement reagent after the setup or executing the reagent reset after the reagent setup window is closed. By means of the reagent replacement method, the operation process of reagent replacement is simplified.

4 Claims, 7 Drawing Sheets

1032

Reagent Setup

| Reagent Name | Expiration Date | Bar Coded |
|---|---|---|
| DS Diluent | 2036-01-01 | NMJHP73FC74M9PLHF7 |

Input Bar Code

☐☐☐☐☐☐☐☐☐☐☐☐☐☐☐☐☐☐

All reagents have been set up, and automatic replacement is about to begin ( Apply )      ( Replace immediately (12s) )

| Failure information interface | | | | |
| --- | --- | --- | --- | --- |
| Reagent failure | Yes | ☐ | No | ☐ |
| Equipment aging | Yes | ☐ | No | ☐ |
| Program abnormality | Yes | ☐ | No | ☐ |

FIG. 7

REAGENT REPLACEMENT METHOD AND DEVICE OF AN ANALYZER

CROSS-REFERENCE TO RELATED APPLICATIONS

This application is a continuation of International Application No. PCT/CN2018/123295, filed Dec. 25, 2018, the content of which is incorporated herein by reference.

TECHNICAL FIELD

This disclosure relates to the field of in-vitro diagnostic analyzers and, in particular, to a reagent replacement method and device of an analyzer.

BACKGROUND

With the progress of automatic control technology and analysis technology in the medical field, the demands for testing a large number of samples and multiple indexes in the medical field are increasing, and the degree of automation in conventional sample analysis has remarkably improved.

However, with the increase in the speed of sample analysis, the reagent consumption rate of a sample analyzer has also increased so that reagent replacement becomes more and more frequent. When a reagent is expired or insufficient, the sample analyzer reports failure information about expiration or insufficiency of the reagent, and an operator needs to confirm which reagent or reagents is/are failed and replace the failed reagent or reagents.

In the existing reagent replacement process, when failure information about expiration or insufficiency of a reagent is detected, automatic sample conveying will stop and an alarm is sent to remind a user. Conventionally, the user is required to turn off the alarm and click on a failure elimination box to view the specific failure information. Later, the user needs to click on a reagent setup window to input information of the replacement reagent, and, after scanning is finished, the user clicks on Exit in the reagent setup window and meanwhile starts the reagent replacement process. During reagent replacement, the user needs to click on a screen of the sample analyzer multiple times, so the whole operation process is complicated.

SUMMARY

The disclosure provides a reagent replacement method and device of an analyzer, by which the operation process of reagent replacement is simplified, the number of times of operation performed on a screen of the sample analyzer by a user is reduced, and working efficiency is improved.

According to a first aspect, an embodiment provides a reagent replacement method of a sample analyzer. The reagent replacement method is used for replacing a failed reagent when a reagent failure of the analyzer is detected, and comprises:

monitoring a working state of the sample analyzer in real-time, and reading failure information when it is detected that an automatic sample conveying of the sample analyzer is stopped;

identifying whether a reagent failure exists among failures;

popping up a reagent setup window automatically to display information of at least one kind of failed reagent if it is determined that a reagent failure exists;

obtaining reagent information of a replacement reagent, which is used to replace the failed reagent, and inputting at least part of the reagent information of the replacement reagent into a corresponding place in the reagent setup window so as to set up the reagent;

closing the reagent setup window after it is detected that the setup of all the failed reagents is completed; and performing a reagent reset after the reagent setup window is closed.

According to a second aspect, an embodiment provides a reagent replacement method of a sample analyzer. The reagent replacement method is used for replacing a failed reagent when a reagent failure of the analyzer is detected, and comprises:

monitoring a working state of the sample analyzer in real-time, and reading failure information when it is detected that an automatic sample conveying of the sample analyzer is stopped;

identifying whether a reagent failure exists among failures;

popping up a reagent setup window automatically to display information of at least one kind of failed reagent if it is determined that a reagent failure exists;

obtaining reagent information of a replacement reagent, which is used to replace the failed reagent, and inputting at least part of the reagent information of the replacement reagent into a corresponding place in the reagent setup window so as to set up the reagent;

performing a reagent reset on the replacement reagent that has been set up; and closing the reagent setup window after it is detected that the setup of all the failed reagents is completed.

According to a third aspect, an embodiment provides a sample analyzer, comprising:

an analysis module configured to collect a sample and a reagent respectively, to mix the sample and the reagent for reaction, and to test the mixed sample after the reaction;

an automatic sample conveying module configured to automatically provide a sample for the analysis module and to stop when a specified failure occurs, the specified failure including at least a reagent failure;

a human-machine interaction module comprising a display and an input device, wherein the display is configured to display a reagent setup window popped up automatically and reagent setup information, and the input device is configured to obtain reagent information of a replacement reagent, which is used to replace the failed reagent; and a processor configured to read failure information when detecting that the automatic sample conveying of the sample analyzer is stopped, to identify whether a reagent failure exists among failures, to automatically pop up the reagent setup window on the display if it is determined that a reagent failure exists, and to display information of at least one kind of failed reagent, wherein the processor is further configured to input at least part of the reagent information of the replacement reagent into a corresponding place in the reagent setup window so as to set up the reagent; and the processor is further configured to close the reagent setup window after detecting that the setup of all the failed reagents is completed, and to perform a reagent reset after the reagent setup window is closed.

According to a fourth aspect, an embodiment provides a sample analyzer, comprising:

an analysis module configured to collect a sample and a reagent respectively, to mix the sample and the reagent for reaction, and to test the mixed sample after the reaction;

an automatic sample conveying module configured to automatically provide a sample for the analysis module and to stop when a specified failure occurs, the specified failure including at least a reagent failure;

a human-machine interaction module comprising a display and an input device, wherein the display is configured to display a reagent setup window popped up automatically and reagent setup information, and the input device is configured to obtain reagent information of a replacement reagent, which is used to replace the failed reagent; and a processor configured to read failure information when detecting that the automatic sample conveying of the sample analyzer is stopped, to identify whether a reagent failure exists among failures, to automatically pop up the reagent setup window on the display if it is determined that a reagent failure exists, and to display information of at least one kind of failed reagent, wherein the processor is further configured to input at least part of the reagent information of the replacement reagent into a corresponding place in the reagent setup window so as to set up the reagent; and the processor is further configured to perform a reagent reset on the replacement reagent that has been set up, and to close the reagent setup window after detecting that the setup of all the failed reagents is completed.

According to a fifth aspect, an embodiment provides a computer-readable storage medium comprising a program which is executable by a processor to implement the method as described above.

In the embodiments of the disclosure, when a reagent failure (such as reagent insufficiency or expiration) occurs in the sample analyzer, the reagent setup window can be popped up automatically, after the reagent information of the replacement reagent is obtained (for example, the reagent information is obtained by scanning a bar code of the replacement reagent), the reagent information is automatically input into the reagent setup window, a reagent reset (e.g., reagent replacement, replenishment and so on) is performed, and the reagent setup window may also be automatically closed after the setup of the failed reagent is completed or after the reagent is reset, so that the reagent replacement efficiency can be improved, the reagent failures can be quickly eliminated, and manual operations can be reduced.

BRIEF DESCRIPTION OF THE DRAWINGS

FIG. 7 illustrates a failure information interface.

DETAILED DESCRIPTION

Figure 1:
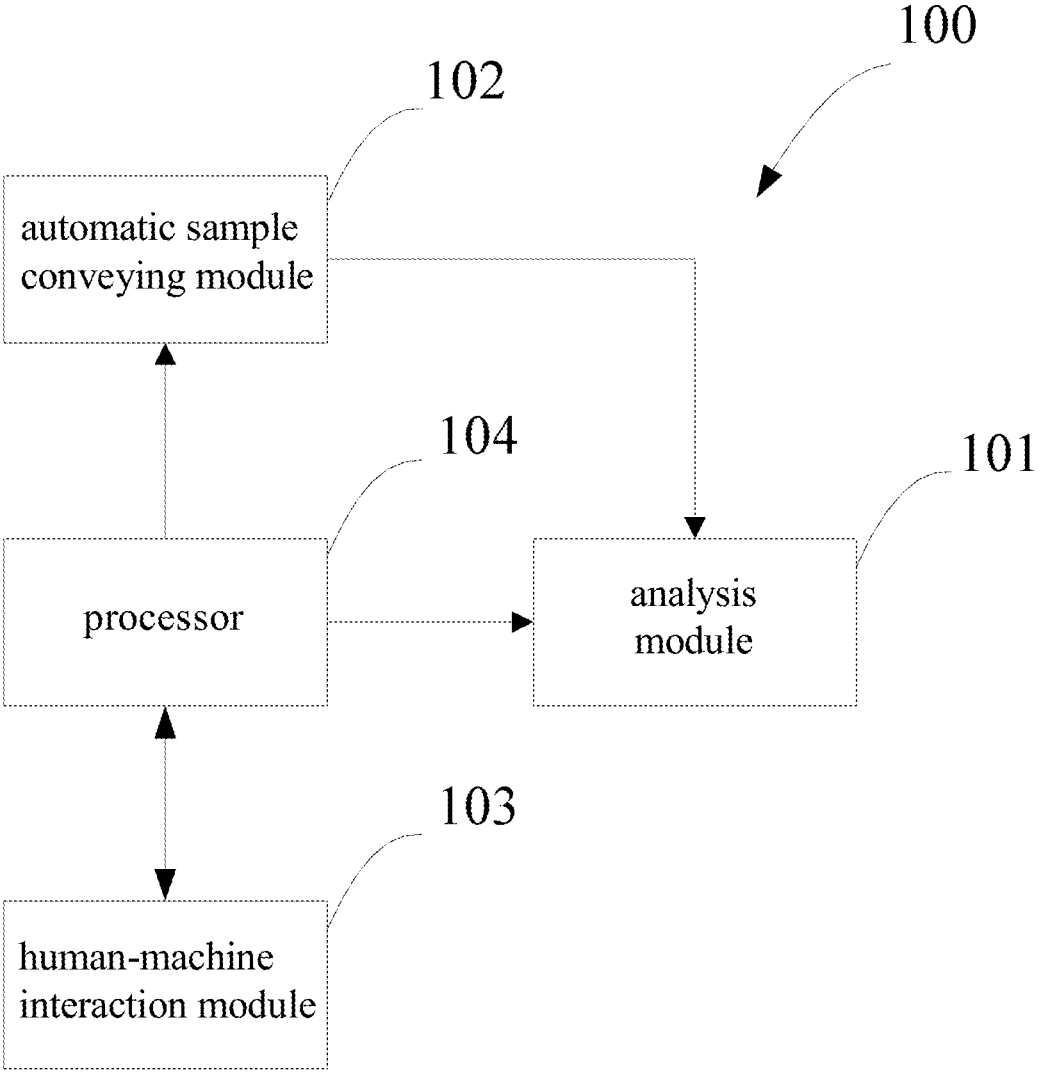
FIG. 1 is a structural diagram of a sample analyzer.

The disclosure will be further described in detail below through specific implementations in conjunction with the accompanying drawings. Associated similar element reference numerals are used for similar elements in different implementations. In the following implementations, many details are described such that the present application can be better understood. However, it may be effortlessly appreciated by a person skilled in the art that some of the features may be omitted, or may be substituted by other elements, materials, and methods in different cases. In certain cases, some operations involved in the present application are not displayed or described in the specification, which is to prevent a core part of the present application from being obscured by too much description, and for a person skilled in the art, the detailed description of these involved operations is not necessary, and the involved operations can be thoroughly understood according to the description in the specification and the general technical knowledge in the art.

In addition, the characteristics, operations, or features described in the specification may be combined in any appropriate manner to form various implementations. Moreover, the steps or actions in the method description may also be exchanged or adjusted in order in a way that is obvious to a person skilled in the art. Therefore, the various orders in the specification and the accompanying drawings are merely for the purpose of clear description of a certain embodiment and are not meant to be a necessary order unless otherwise stated that a certain order must be followed.

The serial numbers themselves for the components herein, for example, "first" and "second", are merely used to distinguish the described objects, and do not have any sequential or technical meaning. Moreover, as used in the present application, "connection" or "coupling", unless otherwise specified, comprises both direct and indirect connections (couplings).

In the embodiments of the disclosure, a reagent replacement method of a sample analyzer and a sample analyzer are provided. When an automatic sample conveying in the sample analyzer is stopped due to a reagent failure, the sample analyzer will automatically pop up a reagent setup window and set up a replacement reagent, and close the reagent setup window automatically or according to an instruction inputted by a user after it is detected that the setup of all the failed reagents is completed. By means of the reagent replacement method, the operation process of reagent replacement is simplified, the number of times of operation performed on a screen of the sample analyzer by a user is reduced, and the working efficiency is improved.

In an embodiment of the disclosure, a sample analyzer is provided. Referring to FIG. 1, the sample analyzer 100 comprises an analysis module 101, an automatic sample conveying module 102, a human-machine interaction module 103, and a processor 104. The processor 104 is in a signal connection with the analysis module 101, the automatic sample conveying module 102 and the human-machine interaction module 103 respectively, and the automatic sample conveying module 102 is structurally connected to the analysis module 101 and configured to provide a sample for the analysis module 101.

The analysis module 101 is in a signal connection with the processor 104 and is configured to respectively collect a sample and a reagent according to a received control instruction sent by the processor, to mix the sample and the reagent for reaction, and to test the mixed sample after the reaction. In some embodiments, the analysis module 101 comprises at least one sampler and a moving mechanism, wherein the moving mechanism moves the sampler to the above of a container containing a reagent (e.g., a reservoir) according to a control instruction of the processor, after the sampler suctions a proper amount of the reagent from the container containing the reagent, the moving mechanism moves the sampler to the above of a container containing a sample (e.g., a test tube or a reaction vessel), the sampler injects the suctioned reagent into the container containing the sample, and the sample and the reagent are mixed to react. In some embodiments, the analysis module 101 further comprises a reaction container, and the sampler is configured to suction the reagent and the sample respectively from the container containing the reagent and the container containing the sample, and to sequentially inject them into the reaction container for reaction. This way is particularly suitable for a situation in which it is required to test the same sample for multiple times.

The automatic sample conveying module 102 is in a signal connection with the processor 104, and is configured to automatically provide samples for the analysis module 101 according to a received control instruction sent by the processor 104, and to stop providing samples for the analysis module 101, that is, and to stop automatic sample conveying when a specified failure occurs. The specified failure includes at least a reagent failure and may further include some failures that can be automatically eliminated by the sample analyzer and some failures that cannot be automatically eliminated by the sample analyzer in addition to the reagent failure. The reagent failure includes reagent expiration and reagent insufficiency.

The human-machine interaction module 103 is in a signal connection with the processor 104 and comprises a display and an input device, the display being configured to display a reagent setup window popped up automatically and reagent setup information. In some embodiments, the display is further configured to display a failure information interface popped up automatically, and to automatically close the failure information interface according to an instruction of the processor when the processor 104 identifies that reagent failure information exists in the failure information.

Figure 2:
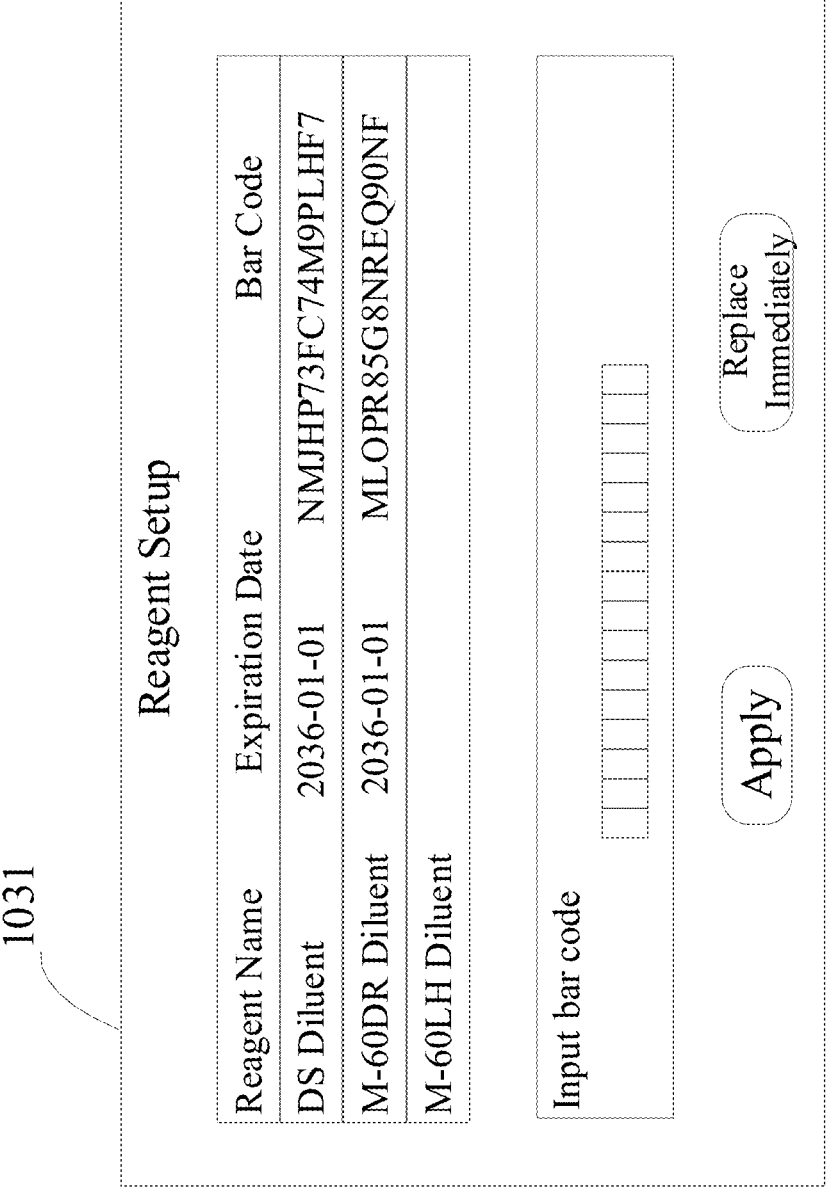
FIG. 2 is a schematic diagram of a reagent setup window of an embodiment.
Figures 3, 4A:
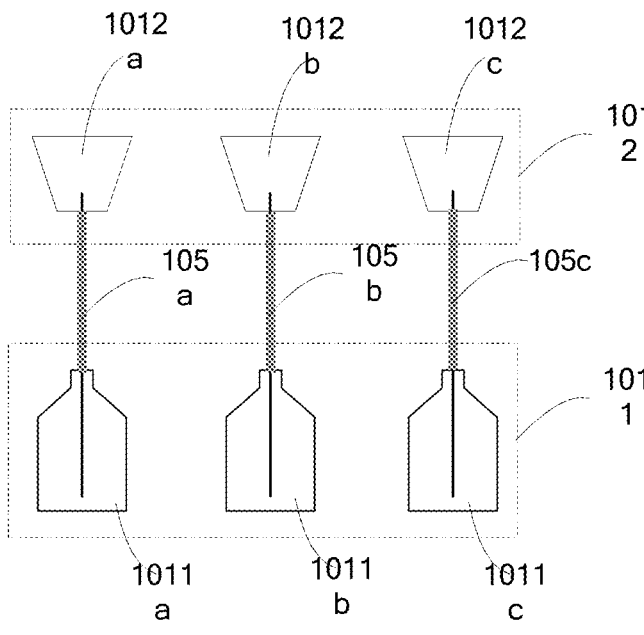
FIG. 3 is a schematic diagram of a reagent setup window of another embodiment.
FIG. 4A is a schematic diagram of an embodiment of transferring reagents from reagent containers to reservoirs.

In a particular embodiment, when the processor identifies from the failure information that at least two kinds of reagents have reagent failures, after the reagent setup window is popped up automatically, information of all the reagents having reagent failures is displayed. Referring to FIG. 2, the reagent setup window 1031 is configured to simultaneously display reagent information of three kinds of reagents having reagent failures. In some embodiments, when the processor identifies from the failure information that at least two kinds of reagents have reagent failures, after the reagent setup window is popped up automatically, information of only one reagent among all the reagents having reagent failures is displayed and then information of the next failed reagent is displayed after the setup of the one reagent is completed. Referring to FIG. 3, the reagent setup window 1032 only displays information of one reagent (such as a DS diluent shown in the figure) among all the reagents having reagent failures, and then displays information of the next failed reagent after the setup of that reagent is completed, so as to set up the next failed reagent. Preferably, the reagent setup window popped up on the display displays the information of all the reagents having reagent failures. If the reagent setup window popped up on the display is only configured to display the information of one reagent among all the reagents having reagent failures, it is very difficult for a user to determine whether a further reagent needs to be set up or what reagent needs to be set up next during setup of the current reagent. However, by means of a solution of displaying the information of all the reagents having reagent failures, the user can easily determine whether a further reagent needs to be set up or what reagent needs to be set up next, facilitating the user in preparing for the following operations according to this information, so that the working efficiency is improved. In some embodiments, after the user obtains the information of all the reagents having reagent failures through the display, the user may also select a reagent to set up according to actual conditions without the need for performing the setup according to a sequence displayed in the reagent setup window. When the processor identifies from the failure information that only one kind of reagent has a reagent failure, the above two display modes are the same and will not be described in detail herein.

The input device is configured to obtain reagent information of a replacement reagent so as to set up a reagent having a reagent failure. The input device may be a keyboard, a mouse, a scanner and so on, or may be a touch screen integrated with the display, and the user inputs the reagent information of the replacement reagent through the input device. When the input device is a keyboard, the user can directly input the reagent information of the replacement reagent through the keyboard; when the input device is a mouse or a touch screen, the user can input the reagent information of the replacement reagent through the input device and a soft keyboard, operation icons, tabs, etc. on the display; and when the input device is a scanner, the user can complete the input of the reagent information of the replacement reagent only by scanning a two-dimensional code or a bar code with the reagent information of the replacement reagent in a code scanning area close to the scanner. Referring to FIGS. 2 and 3, the reagent information comprises at least a reagent name and a reagent expiration date. In some embodiments, the reagent information further comprises a reagent bar code, and each reagent has a unique reagent bar code, so that the reagent name and the reagent expiration date can be acquired by inputting the reagent bar code according to the one-to-one correspondence between reagents and reagent bar codes.

The processor 104 is configured to read failure information when detecting that the automatic sample conveying module 102 of the sample analyzer stops automatic sample conveying, and to analyze the failure information to identify whether a reagent failure exists among failures, to automatically pop up the reagent setup window on the display if it is determined that a reagent failure exists, and to display information of at least one kind of failed reagent; the processor is further configured to input at least part of the reagent information of the replacement reagent into a corresponding place in the reagent setup window so as to set up the reagent; and the processor is further configured to close the reagent setup window after detecting that the setup of all the failed reagents is completed, and to perform a reagent reset after the reagent setup window is closed.

In some embodiments, the processor is further configured to perform the reagent reset on the replacement reagent that has been set up once detecting that the setup of a failed reagent is completed, and to close the reagent setup window after detecting that the setup of all the failed reagents is completed. When there is only one kind of reagent having a reagent failure, the processing method of the embodiment is the same as that of the previous embodiment, and after the setup of the replacement reagent is completed, the reagent setup window is closed and meanwhile the reagent reset is performed. When there are at least two kinds of reagents having reagent failures, after the setup of the first kind of failed reagent is completed, the second kind of failed reagent is set up and a reagent reset of the first kind of replacement reagent is performed at the same time. A reagent reset of the second kind of reagent is performed after the reset of the first kind of replacement reagent is completed, the reagent setup window is closed until the setup of all the failed reagents is completed, but the reagent reset of the replacement reagent that has been set up continues to perform.

The way of closing the reagent setup window after the processor detects that the setup of all the failed reagents is completed may include closing the reagent setup window immediately after the processor detects that the setup of all the failed reagents is completed; or may include closing the reagent setup window automatically over a preset time of delay after the processor detects that the setup of all the failed reagents is completed; or may include closing the reagent setup window automatically over a preset time of delay after the processor detects that the setup of all the failed reagents is completed or according to an instruction inputted by the user within a preset time.

In some embodiments, the processor is further configured to output the information of all the reagents having reagent failures to the display for displaying after the reagent setup window is popped up automatically, and then to determine the input place of the reagent information of the replacement reagent according to reagent name information of the replacement reagent. In some embodiments, the processor is further configured to firstly display information of one reagent among all the reagents having reagent failures after the reagent setup window is popped up automatically, and to display information of the next failed reagent after the setup of that reagent is completed.

In this embodiment, the processor does not output all reagent information of the replacement reagent to the display for displaying. In a preferred embodiment, the processor outputs only part of the reagent information of the replacement reagent that is used for reagent management to the display for displaying same.

In some embodiments, the processor is further configured to automatically pop up a failure information interface on the display upon reading the failure information, and to automatically close the failure information interface upon identifying that reagent failure information exists in the failure information.

In a particular implementation, the process in which the processor performs the reagent reset on the replacement reagent may include suctioning the replacement reagent from an original reagent container into a reservoir, or may include controlling a reagent disc to reset, or may include a signal of restarting detection. The original reagent container is generally pasted with a bar code carrying reagent information, and the reagent information can be obtained by scanning the bar code; and after the reagent is suctioned from the original reagent container into the reservoir, the analyzer can suction the reagent from the reservoir as required to perform corresponding operations during working. The reagent reset further includes reagent replacement, reagent replenishment and other operations. For example, in the event of a failure that a certain kind of reagent is expired, the expired reagent is removed or drained, a replacement reagent is replenished to a storage location of that reagent, and the analyzer suctions or aspirates the reagent from the storage location of the reagent in need of using the reagent.

When the process of performing the reagent reset on the replacement reagent includes suctioning the replacement reagent from the original reagent container into the reservoir, the sample analyzer 100 further comprises delivery pipelines and power devices, wherein the delivery pipelines are connected between the original reagent containers and the reservoirs, and each power device is in a signal connection with the processor and is configured to deliver a replacement reagent from its original reagent container to a corresponding reservoir through a delivery pipeline under the control of the processor. When at least two kinds of reagent failures are detected, the processor is further configured to control the power devices to deliver replacement reagents that have been set up from the original reagent containers to the corresponding reservoirs through the delivery pipelines.

Figure 4B:
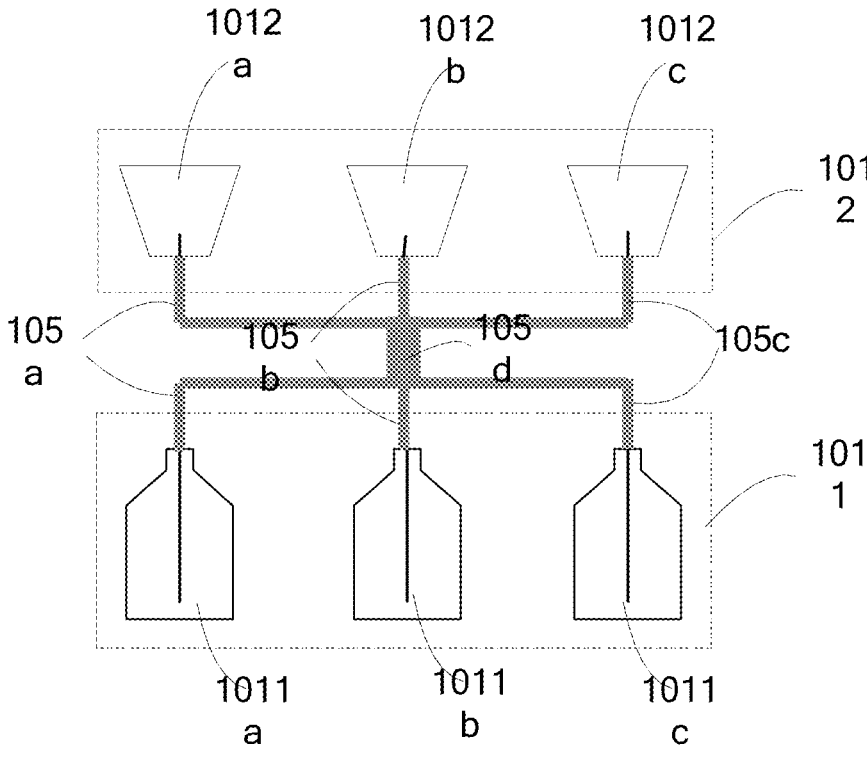
FIG. 4B is a schematic diagram of another embodiment of transferring reagents from reagent containers to reservoirs.

Referring to FIGS. 4A and 4B, in a specific embodiment, it is taken as an example for description that the processor detects three kinds of reagent failures, and suctions three kinds of corresponding replacement reagents that have been set up respectively from a first reagent container 1011a, a second reagent container 1011b, and a third reagent container 1011c to a corresponding first reservoir 1012a, second reservoir 1012b and third reservoir 1012c. In other cases, a reagent reset of a replacement reagent is performed using the same or similar method as in this process.

FIG. 4A shows that there are separate pipelines for communication between the reagent containers and the reservoirs, that is, the first reagent container 1011a and the first reservoir 1012a communicate with each other through the first delivery pipeline 105a, the second reagent container 1011b and the second reservoir 1012b communicate with each other through the second delivery pipeline 105b, and the third reagent container 1011c and the third reservoir 1012c communicate with each other through the third delivery pipeline 105c. After receiving reagent reset instructions sent by the processor, the power devices respectively deliver the replacement reagents that have been set up from the original reagent containers 1011 to the corresponding reservoirs 1012 through the respective delivery pipelines. Since the first delivery pipeline 105a, the second delivery pipeline 105b and the third delivery pipeline 105c for delivering the three kinds of reagents work independently from each other, the processor may control the power devices to perform reagent resets on the three kinds of reagents simultaneously in order to save time. In some embodiments, in order to simplify the structure of the power devices, there may also be only one power device or a smaller number of power devices, and the processor controls the power device(s) to move between the delivery pipelines to perform reagent resets on the three kinds of reagents one by one.

FIG. 4B shows a schematic diagram of a common delivery pipeline provided between a plurality of reagent containers and a plurality of reservoirs. The process, in which the processor controls the power devices (not shown) to deliver the replacement reagents that have been set up from the original reagent containers 1011 to the corresponding reservoirs 1012 through the delivery pipelines, differs from that shown in FIG. 4A in that: in FIG. 4B, besides the three delivery pipelines (the first delivery pipeline 105a, the second delivery pipeline 105b, and the third delivery pipeline 105c) working independently from each other, a common delivery pipeline 105d is further provided in communication with the three delivery pipelines at the junction of the three delivery pipelines, and the common delivery pipeline 105d will be flowed through when each of the three kinds of replacement reagents that have been set up is delivered from the original reagent container 1011 to the corresponding reservoir 1012 through the delivery pipeline. Therefore, when the reagent resets of the replacement reagents are performed, the three kinds of reagents need to be reset one by one, the common delivery pipeline is cleaned after one kind of reagent is replaced, and the next kind of replacement reagent is reset after the cleaning is finished until the resets of all the replacement reagents are completed.

Therefore, in the embodiments of the disclosure, a reagent failure display interface and a failed reagent setup interface can be automatically popped up when a reagent failure (such as reagent insufficiency, and reagent expiration) occurs, after the replacement reagent is scanned, reagent information can be automatically inputted (the reagent information may also be manually inputted), and a reagent reset (such as reagent replenishment, and reagent replacement) is automatically performed; and if a plurality of reagent failures exist, reagent resets may also be implemented serial (replacing or replenishing different reagents one by one) or parallel (replacing or replenishing different reagents simultaneously). In this way, the reagent reset efficiency can be improved, and user operations can be reduced.

The failed reagent can be replaced by the sample analyzer described above when it is detected that a reagent failure occurs in the sample analyzer. A reagent replacement method of the sample analyzer will be described in detail with reference to FIG. 5, comprising the following steps.

At step 111, a working state of the sample analyzer is monitored in real-time, and failure information is read when it is detected that automatic sample conveying of the sample analyzer is stopped. When it is detected that the working state of the sample analyzer is abnormal, namely a failure occurs, the automatic sample conveying is stopped, and a processor reads the failure information. There are many kinds of failures that lead to the stop of the automatic sample conveying of the sample analyzer, such as a reagent failure, an equipment aging, and a program abnormality, wherein the reagent failure includes reagent expiration and reagent insufficiency.

At step 112, whether a reagent failure exists among failures is identified. Step 113 is executed if no reagent failure exists, and step 114 is executed if a reagent failure exists.

At step 113, if the processor does not identify a reagent failure from the failure information, the processor will process the other failures. In some embodiments, a failure information interface will be popped up on a display automatically or upon receiving an instruction inputted by a user, and the failure information interface is used for displaying the failure information read in step 111.

At step 114, a reagent setup window is automatically popped up to display information of at least one kind of failed reagent. When the processor identifies a reagent failure from the failure information, the processor will pop up a reagent setup window automatically on the display, and the reagent setup window is configured for displaying the information of the failed reagent. If the processor identifies from the failure information that at least two kinds of failed reagents exist, the information of all the failed reagents may be displayed after the reagent setup window is popped up automatically; or information of one reagent among all the failed reagents is firstly displayed after the reagent setup window is popped up automatically, and then information of the next failed reagent is displayed after the setup of the one reagent is completed. At this time, the information of the failed reagent(s) displayed on the reagent setup window comprises at least name information of the failed reagent(s).

In some embodiments, the failure information interface may be popped up automatically on the display interface after the failure information is read, and the failure information interface is automatically closed and the reagent setup window is popped up automatically when it is identified that reagent failure information exists in the failure information.

At step 115, reagent information of a replacement reagent is obtained, which is used to replace the failed reagent, and at least part of the reagent information of the replacement reagent is inputted into a corresponding place in the reagent setup window so as to set up the reagent. The reagent information of the replacement reagent corresponding to the failed reagent is input into a corresponding place in the reagent setup window according to the information of the failed reagent displayed in the reagent setup window. In a specific embodiment, the user needs to select the same replacement reagent as the failed reagent for reagent information input according to name information of the failed reagent displayed in the reagent setup window, and the processor inputs at least part of the reagent information into the corresponding place in the reagent setup window after receiving the reagent information inputted by the user. When the reagent setup window displays at least two kinds of failed reagents, the processor is further configured to determine input places of reagent information of replacement reagents according to reagent name information of the replacement reagents. The at least part of the information inputted into the reagent setup window refers to information used for reagent management, which comprises at least reagent name information and a reagent expiration date.

Since the same kind of reagent may comprises a plurality of reagents having the same reagent name information and the same reagent expiration date, in some embodiments, in order to distinguish the reagents having the same reagent name information and the same reagent expiration date, the at least part of the information inputted into the reagent setup window also comprises a reagent bar code, and each reagent has a unique reagent bar code, and the processor can obtain other reagent information of a reagent through the reagent bar code thereof.

At step 116, it is determined whether the setup of all the failed reagents is completed, step 117 is executed if the setup of all the failed reagents is completed, and step 115 is executed if there are still failed reagents which have yet not been set up.

At step 117, the reagent setup window is closed after the processor detects that the setup of all the failed reagents is completed. The way of closing the reagent setup window may be that the reagent setup window is closed immediately after the processor detects that the setup of all the failed reagents is completed; or may be that the reagent setup window is automatically closed over a preset time of delay after the processor detects that the setup of all the failed reagents is completed; or may be that the reagent setup window is automatically closed over a preset time of delay or is closed according to an instruction inputted by a user within a preset time after the processor detects that the setup of all the failed reagents is completed. The preset time is a default set time, or a time set by a user through an input device according to an actual operation process, such as 30 s, or 20 s.

Referring to FIG. 3, when the processor detects that the setup of all the failed reagents is completed, a countdown of the preset time is started, and the reagent setup window is automatically closed when the countdown reaches zero, and the reagent setup window is automatically closed after 12 seconds from the current time shown in the figure. In some embodiments, during the countdown of the preset time, the processor may further close the reagent setup window according to an instruction input by a user, as shown in the figure. If the user clicks on "immediate replace" through a mouse or a touch screen when the countdown is not finished, the reagent setup window may be directly closed. In some embodiments, the preset time may also be displayed in other manners (e.g., count-up), or the preset time may also not be displayed.

At step 118, a reagent reset is performed. The process, in which the processor performs the reagent reset of the replacement reagent, may include suctioning the replacement reagent from its original reagent container into a reservoir, or may include controlling a reagent disc to reset, or may include a signal of restarting detection. When it is detected that there are at least two kinds of reagent failures, the replacement reagents that have been set up may be suctioned into respective reservoirs in a serial or parallel manner, with reference to the above description of the specific processes shown in FIGS. 4A and 4B.

The above process means that the processor needs to set up all the failed reagents first, and then perform reagent resets only after the setup of all the failed reagents is completed. This processing method is feasible when fewer reagents have reagent failures, but when multiple kinds of reagents have reagent failures, it may take a long time from the completion of the setup of the first failed reagent to the completion of the setup of all the failed reagents, and the reagents that have been set up previously are in a waiting state during this period, so that the time period, during which the reagents that have been set up are in the waiting state, prolongs the time period for troubleshooting the reagent failures to a certain extent, and the efficiency is reduced.

Figure 6:
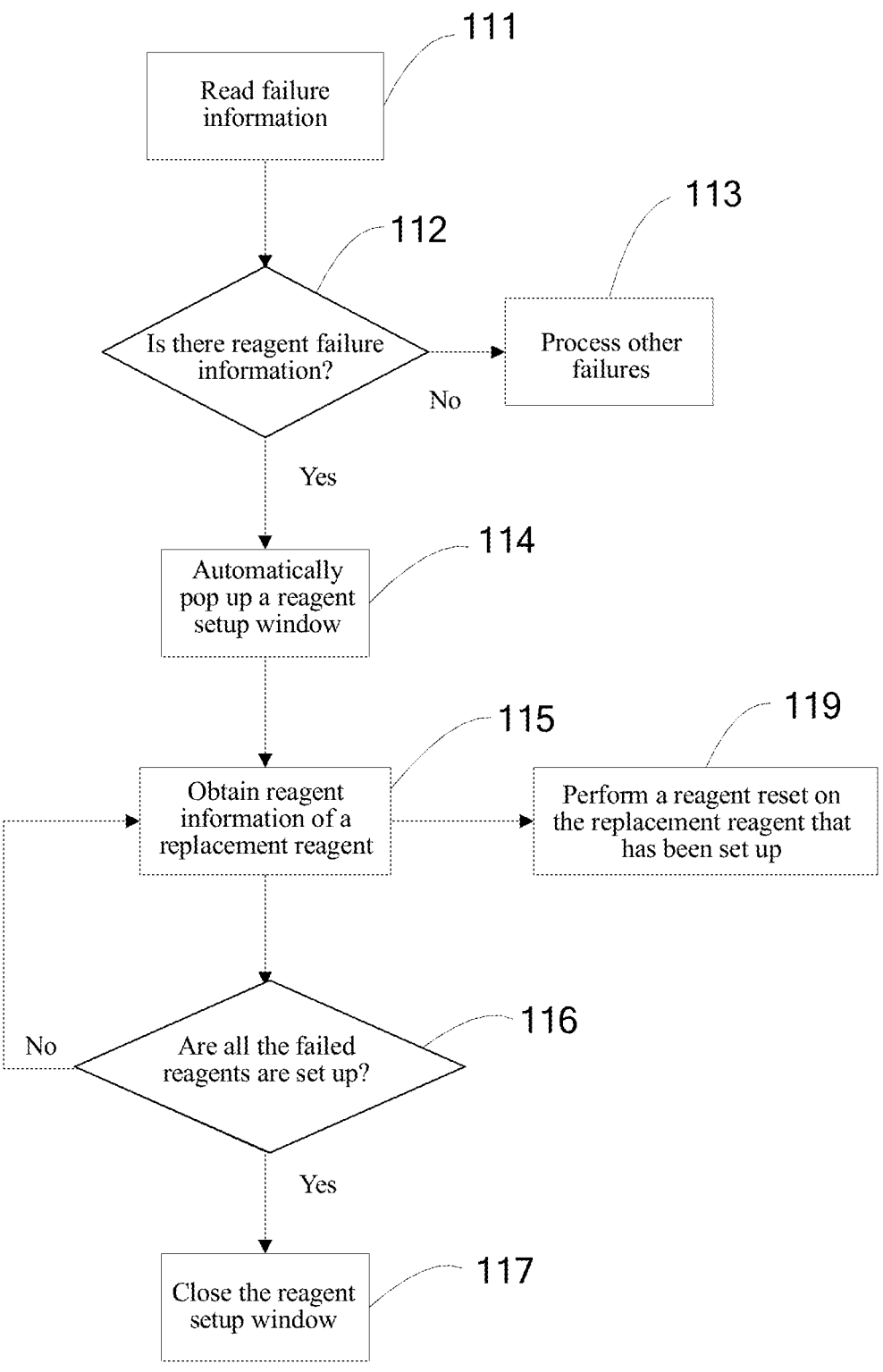
FIG. 6 is a flow chart of a reagent replacement method of another embodiment.

In order to further improve the efficiency of troubleshooting the reagent failures, a reagent replacement method of a sample analyzer is specifically described in another embodiment. Referring to FIG. 6, the reagent replacement method comprises the following steps.

Figure 5:
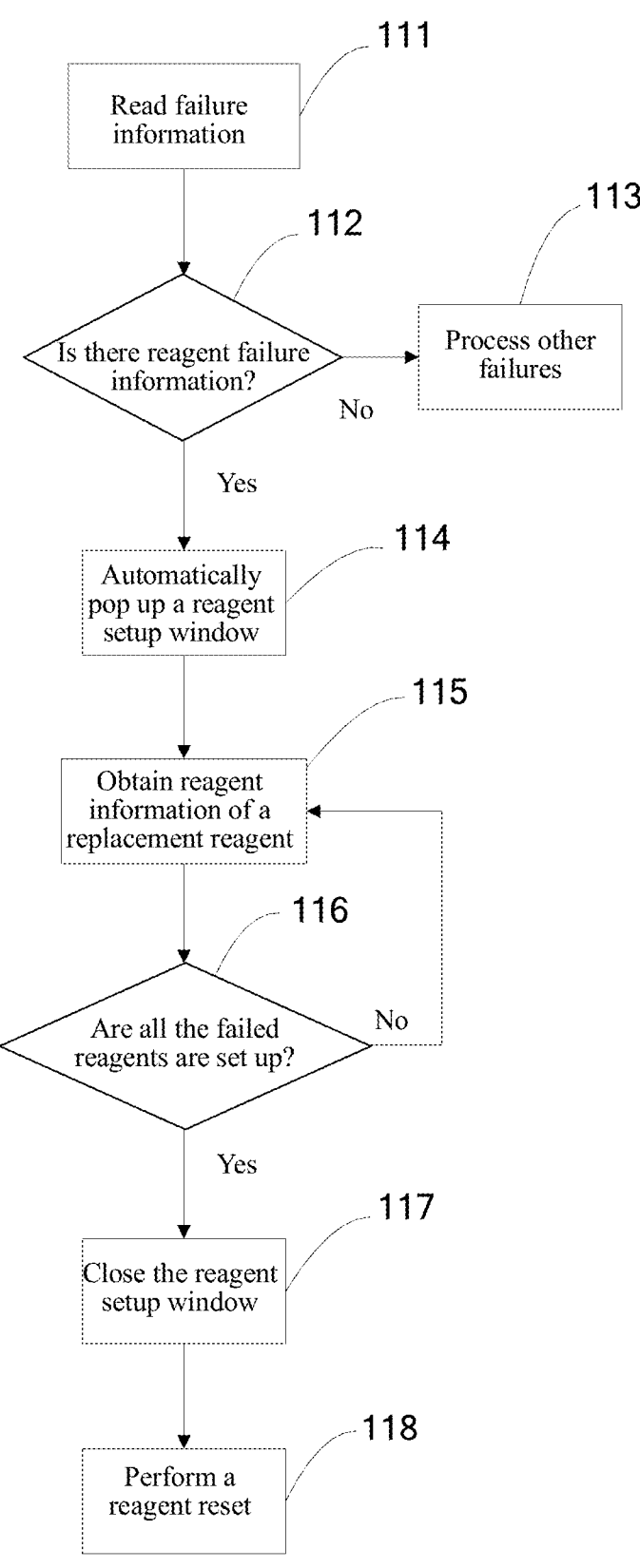
FIG. 5 is a flow chart of a reagent replacement method of an embodiment.

Steps 111-117 are the same as those in the processing method of the embodiment shown in FIG. 5 and will not be described in detail herein.

At step 119, a reagent reset is performed on the replacement reagent that has been set up. Unlike the processing method of the embodiment shown in FIG. 5, in this embodiment, right after the setup of at least one replacement reagent is completed, a reagent reset is performed on the replacement reagent that has been set up, which is no longer directly related to the operation of closing the reagent setup window in step 117. As with the embodiment described above, the process, in which the processor performs the reagent reset on the replacement reagent, may include suctioning the replacement reagent from its original reagent container into a reservoir, or may include controlling a reagent disc to reset, or may include a signal of restarting detection. When it is detected that there are at least two kinds of reagent failures, the replacement reagents that have been set up may also be suctioned into respective reservoirs in a serial or parallel manner.

The disclosure has been described with reference to various exemplary embodiments herein. However, those skilled in the art would have appreciated that changes and modifications could have been made to the exemplary embodiments without departing from the scope of the disclosure. For example, various operation steps and components for performing operation steps may be implemented in different ways according to specific applications or considering any number of cost functions associated with the operation of the system (e.g., one or more steps may be deleted, modified or incorporated into other steps).

In addition, as understood by those skilled in the art, the principles herein may be reflected in a computer program product on a computer-readable storage medium that is pre-installed with computer-readable program codes. Any tangible, non-transitory computer-readable storage medium may be used, including magnetic storage devices (hard disks, floppy disks, etc.), optical storage devices (CD-ROM, DVD, Blu Ray disks, etc.), flash memories, and/or the like. These computer program instructions may be loaded onto a general-purpose computer, a special computer, or other programmable data processing apparatus to form a machine, such that these instructions executed on a computer or other programmable data processing device can generate a device that implements a specified function. These computer program instructions can also be stored in a computer-readable memory that can instruct a computer or other programmable data processing device to operate in a specific manner, such that the instructions stored in the computer-readable memory can form a manufactured product, including an implementation apparatus that implements a specified function. The computer program instructions may also be loaded onto a computer or other programmable data processing apparatus, such that a series of operating steps are performed on the computer or other programmable apparatus to produce a computer-implemented process, such that the instructions executed on the computer or other programmable data processing apparatus can provide steps for implementing specified functions.

Although the principles herein have been shown in various embodiments, many modifications of structures, arrangements, ratios, elements, materials, and components that are particularly suitable for specific environments and operating requirements can be made without departing from the principle and scope of the present disclosure. The above modifications and other changes or amendments will be included within the scope herein.

The foregoing specific description has been described with reference to various embodiments. However, those skilled in the art would have appreciated that various modifications and changes could have been made without departing from the scope of the present disclosure. Therefore, consideration of the present disclosure will be in an illustrative rather than a restrictive sense, and all such modifications will be included within the scope thereof. Likewise, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprising" and any other variants thereof used herein are non-exclusive, such that the process, method, document, or apparatus that includes a list of elements includes not only these elements, but also other elements that are not explicitly listed or do not belong to the process, method, system, document, or apparatus. Furthermore, the term "coupling" and any other variants thereof used herein refer to physical connection, electrical connection, magnetic connection, optical connection, communication connection, functional connection, and/or any other connection.

Those skilled in the art will recognize that many changes may be made to the details of the above-described embodiments without departing from the basic principles of the disclosure. Therefore, the scope of the disclosure should be determined according to the claims as follows.

The invention claimed is:

1. A sample analyzer, comprising:

a plurality of original reagent containers configured to provide original reagents;

a detector collocated with the plurality of original reagent containers;

a plurality of reservoirs configured to receive the original reagents from the plurality of original reagent containers;

a plurality of pipelines between the plurality of original reagent containers and the plurality reservoirs configured to transfer the original reagents;

an analysis module including:

a reaction container;

a suction sampler configured to:

collect a sample from a sample container; and a moving mechanism configured to move the suction sampler over the sample container and the reaction container;

wherein the analysis module is configured to:

mix the collected sample with a reagent from at least one of a plurality of original reagent containers for reaction in the reaction container; and test the sample after the reaction;

a human-machine interaction module comprising a screen configured to display a reagent setup window;

an input device configured to receive reagent information from the plurality of original reagent containers; and;

a processor connected with the analysis module and the human-machine interaction module and configured to:

detect a stoppage of sample conveying;

receive first information indicating one or more of failed reagents containing expired or insufficient reagents based on the reagent information received by the input device;

instruct the screen to automatically pop up the reagent setup window and display failure information upon receiving the first information;

receive second information indicating that a replacement reagent container containing a replacement reagent has been detected by the detector; and instruct the screen to replace the failure information with information of the replacement reagent in the reagent setup window, wherein the information of the replacement reagent comprises at least a reagent name and a reagent expiration date;

start a timer of a fixed time period and pop up a button on which countdown of the fixed time period is displayed in response to that all failure information in the reagent setup window has been replaced with information of replacement reagents;

automatically close the reagent setup window without user input in response to expiration of the fixed time period, or immediately close the reagent setup window in response to a user input on the button before the countdown is finished; and after the reagent setup window is closed, control the replacement reagent to be aspirated from the replacement reagent container into a reservoir for a failed reagent to replace the failed agent through a corresponding delivery pipeline connected between the replacement reagent container and the reservoir for the failed reagent;

wherein the input device comprises a scanner;

wherein the processor is further configured to:

obtain the information of the replacement reagent from the scanner;

determine a location in the reagent setup window for displaying the information of the replacement reagent according to the reagent name of the replacement reagent; and input at least part of the information of the replacement reagent into the location in the reagent setup window; or wherein the processor is further configured to:

receive user input at the location in the reagent setup window to obtain the information of the replacement reagent.

2. The sample analyzer of claim 1, wherein the processor is further configured to output information of all failed reagents to the screen after the reagent setup window is automatically popped up.

3. A reagent replacement method of a sample analyzer, the method comprising:

receiving first information indicating one or more of failed reagents containing expired or insufficient reagents based on reagent information received by an input device;

causing a screen to:

automatically pop up a reagent setup window; and display failure information upon receiving the first information;

receiving, from the input device, second information indicating that a replacement reagent container containing a replacement reagent has been detected by a detector;

obtaining information of the replacement reagent from a scanner;

determining a location in the reagent setup window for displaying the information of the replacement reagent according to a reagent name of the replacement reagent; and input at least part of the information of the replacement reagent into the location in the reagent setup window;

causing the screen to display at least part of the information of the replacement reagent in a corresponding location in the reagent setup window to replace information of the failed reagent;

starting a timer of a fixed time period and popping up a button on which countdown of the fixed time period is displayed in response to that all failure information in the reagent setup window has been replaced with information of replacement reagents;

automatically closing the reagent setup window without user input in response to expiration of the fixed time period, or immediately closing the reagent setup window in response to a user input on the button before the countdown is finished; and after the reagent setup window is closed, control the replacement reagent to be aspirated from the replacement reagent container into a reservoir for the failed reagent to replace the failed agent through a corresponding delivery pipeline connected between the replacement reagent container and the reservoir for the failed reagent.

4. The method of claim 3, further comprising:

outputting information of all failed reagents to the screen after the reagent setup window is automatically popped up.

* * * * *